United States Patent [19]

Porter et al.

[11] Patent Number: 5,252,897
[45] Date of Patent: Oct. 12, 1993

[54] DUAL MOTOR WIPER CONTROL

[75] Inventors: Eugene B. Porter, Beavercreek; Thomas W. Holmes, Centerville, both of Ohio

[73] Assignee: General Motors Corporation, Detroit, Mich.

[21] Appl. No.: 867,554

[22] Filed: Apr. 13, 1992

[51] Int. Cl.$^5$ ............................................. B60S 1/08
[52] U.S. Cl. ..................................... 318/443; 318/444; 318/DIG. 2; 318/54
[58] Field of Search .................... 318/420–470, 318/262–283, 54; 15/250.12, 250.13, 250.17, 250.34, 250.27

[56] References Cited

U.S. PATENT DOCUMENTS

| | | | |
|---|---|---|---|
| 3,049,742 | 8/1962 | Kato et al. | 318/443 |
| 3,721,878 | 3/1973 | Gumbert | 318/443 |
| 4,405,887 | 9/1983 | Tamura et al. | 318/443 |
| 4,431,954 | 2/1984 | Carpenter et al. | 318/443 |
| 4,585,980 | 4/1986 | Gille et al. | 318/444 |
| 4,665,488 | 5/1987 | Graham et al. | 364/424 |
| 4,670,695 | 6/1987 | Licata et al. | 318/443 |
| 4,723,101 | 2/1988 | Bauer et al. | 318/443 |
| 4,900,995 | 2/1990 | Wainwright | 318/443 |
| 4,900,996 | 2/1990 | Wainwright | 318/443 |
| 4,904,908 | 2/1990 | Buschur | 318/282 |
| 5,157,314 | 10/1992 | Kuhbauch | 318/443 |

Primary Examiner—Paul Ip
Attorney, Agent, or Firm—Howard N. Conkey

[57] ABSTRACT

A motor vehicle glass wiper system includes first and second motor assemblies and respective first and second wiper blades. Each motor assembly is effective to move its respective wiper blade through a wipe pattern that is bounded by an outboard direction reversing position and an inboard direction reversing position. The wipe patterns of the first and second wiper blades overlap to establish an interference zone of potential wiper blade contact which is adjacent both inboard direction reversing positions and bounded thereby. A wiper motor control monitors a respective key position sensor for each wiper blade. The control energizes each one of the wiper motors to move its respective wiper blade to the inboard direction reversing position and back to the outboard direction reversing position each time the key position sensor of the other one of the wiper blades indicates a transition out of the interference zone thereby inhibiting interference between the wiper blades.

7 Claims, 4 Drawing Sheets

DUAL MOTOR WIPER CONTROL

BACKGROUND

The present invention relates to a synchronization control of a two motor dual blade glass wiper system for a motor vehicle. In particular, a control is desirable to prevent wiper blades from contact with each other in such a system wherein the wipe patterns of the individual blades overlap to establish an interference zone.

Conventional dual wiper blade systems utilize one motor and shared mechanical linkages which synchronously drive the wiper blades and prevent interferences by way of hardware. More recent dual wiper blade systems have utilized a motor for each blade and some hardware and/or software controlled switching scheme to control each individual motor's cycling and prevent blade contact. Packaging constraints, especially for backglass wiper systems, in many cases will prevent use of mechanically controlled one motor systems. Two motor systems often rely upon moderately intricate software control and position sensing along the continuum of the wipe pattern or rely upon physically different motor assemblies having a multiplicity of integral high voltage/high current switching cam apparatus thus proliferating part numbers and precluding part interchangeability.

Improvements can be made to such prior art wiper systems. For example, software can be simplified if position sensing resolution is limited to predetermined key positions of a wiper blade in a wipe pattern. Two motor drive systems can utilize one motor assembly part number for both motors to eliminate unnecessary duplicity of similarly functioning parts. Further, by utilizing computer based control, high voltage/high current switching functions can be accomplished external to the motor hardware via more robust and better suited switching circuitry.

SUMMARY

This invention is an improvement over prior art dual wiper blade glass wiper systems. The invention comprises two motors having identical cam based key position sensing apparatus and a computer based control which monitors key positions in a wiper blade's travel and controls motor cycling accordingly so as to prevent a wiper blade from leaving its outboard direction reversing position to begin a wipe cycle until a currently cycling wiper blade has passed through the predetermined zone and is returning to its outboard direction reversing position.

In a specific form of the invention, a key position sensor is a rotational device such as a cam plate whose rotation is synchronous with the travel of the wiper blade. The key position sensors serve to make and break low voltage and low current circuits so as to indicate the key positions via change in the voltage level of the circuits at various points through the rotation of the cam plate. A microcomputer monitors the voltage levels of the circuits and controls the cycling of the motors so as to inhibit interference of the wiper blades. This is accomplished by allowing only one motor to cycle its corresponding wiper blade through a predetermined zone at any time and further by cycling both motors only such that both wiper blades will be moving in the same radial direction.

Further details and advantages of the invention will be apparent from the accompanying drawings and following description of the preferred embodiment.

DETAILED DESCRIPTION OF THE PREFERRED EMBODIMENT

Figure 1:
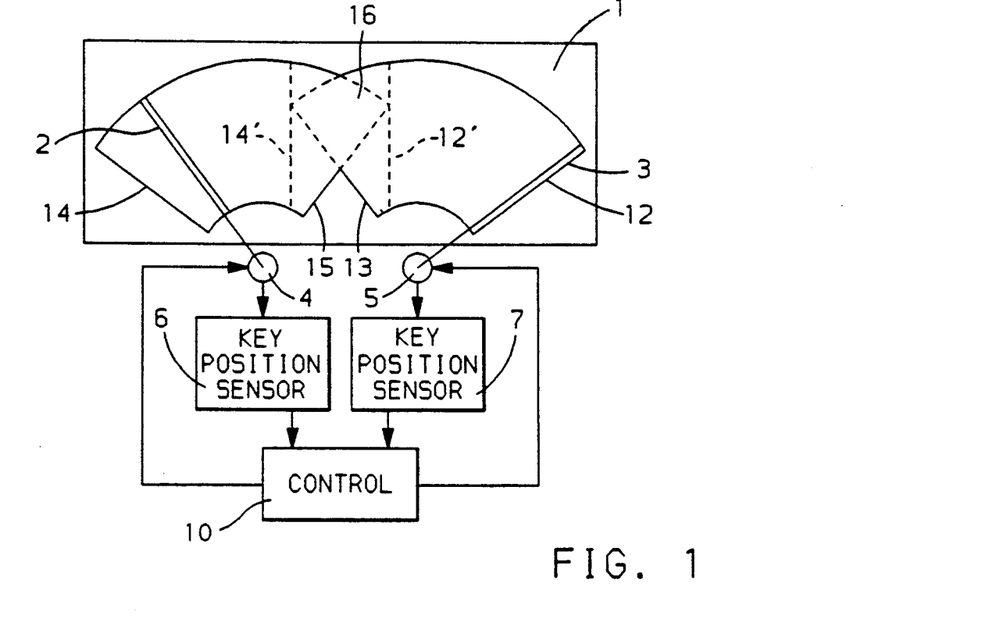
FIG. 1 is a schematic and block diagram of a wiper system according to the invention.

Referring to FIG. 1, a motor vehicle wiper system includes window 1 and two wiper blades 2,3 driven by individual drive motor assemblies 4,5 either directly by an output shaft or via external mechanical linkage. Park positions 12,14 for respective wiper blades 3,2 are located toward the outboard edges of the window, and inboard direction reversing positions 13,15 for respective wiper blades 3,2 are located toward the center of the window. A mode of operation, off [OFF], intermittent run [INT], or continuous run [RUN] is established, such as by mode switch 65 as functionally illustrated in FIG. 2. Key position sensors 6,7 indicate, for respective wiper blades 2,3, entry and exit of park positions 14,12, and entry and exit of interference zone 16 at boundary lines 14',12'. Control 10 monitors output signals from key position sensors 6,7 and causes cycling of motor assemblies 4,5 in response thereto and according to the mode of operation selected, such that interference between wiper blades 2,3 is inhibited.

A wipe pattern is established for a wiper blade as the window area covered by the wiper blade as it travels angularly across the window between its outboard direction reversing position and inboard direction reversing position. In this embodiment, each outboard direction reversing position is also the park positions for its respective wiper blade. This park arrangement places each wiper blade to its extreme outboard position when the system is off. In order to maximize clearing of the window with two such identical wipe patterns, it is desirable to overlap the two patterns near the central portion of window 1. The area of overlap defines interference zone 16. Interference zone 16 is the area on window 1 in FIG. 1 between boundary lines 12' and 14', in which there is potential wiper blade interference. It is desirable to cycle each of the motor assemblies 4,5 such that the wiper blades 2,3 will not interfere with one another. One such way to ensure interference free operation, and the preferred way according to this invention, is to allow the cycling of only one of the two wiper blades 2,3 through interference zone 16 at any time; and, only when a first wiper blade currently cycling through interference zone 16 exits interference zone 16 will a second wiper blade begin to cycle, thus ensuring that at any time both wiper blades 2,3 are cycling simultaneously, a first wiper blade has exited interference zone 16 moving toward its respective park position and a second wiper blade has left its respective park position and is moving in the same radial direction as the first wiper blade.

By way of illustration, assume such a wiper system mode switch is OFF, with motor assemblies 4,5 commanded off and wiper blades 2,3 in respective outboard park positions 14,12. When the mode switch is placed in RUN, motor assembly 5 remains commanded off and motor assembly 4 is commanded on moving wiper blade 2 out of park position 14 and toward the center of window 1, clockwise by way of FIG. 1. Motor assembly 5 continues to be commanded off throughout the portion of wiper blade 2 cycle as it enters interference zone 16 at boundary position 14′, reaches inboard direction reversing position 15, travels now counter-clockwise and exits interference zone 16 at boundary position 14′. When wiper blade 2 exits interference zone 16, motor assembly 5 is commanded on and moves wiper blade 3 out of park position 12 and toward the center of window 1, counter-clockwise. Both motor assemblies 4,5 are now commanded on and both wiper blades 2,3 are out of interference zone 16 and moving in the same radial direction counter-clockwise. Both motor assemblies 4,5 will remain commanded on until wiper blade 2 reaches park position 14, at which time motor assembly 4 is commanded off. Motor assembly 4 continues to be commanded off throughout the portion of wiper blade 3 cycle as it passes through interference zone 16, reaches inboard direction reversing position 13, travels clockwise and exits interference zone 16 at boundary position 12′. When wiper blade 3 exits interference zone 16, motor assembly 4 is commanded on and moves wiper blade 2 out of park position 14 and toward the center of window 1, clockwise. Both motor assemblies 4,5 are now commanded on and both wiper blades 2,3 are out of interference zone 16 and moving in the same radial direction clockwise. Both motor assemblies 4,5 will remain commanded on until wiper blade 3 reaches park position 12, at which time motor assembly 5 is commanded off. This cycling scheme is repeated indefinitely until the mode of operation is changed to OFF or INT.

Figure 2:
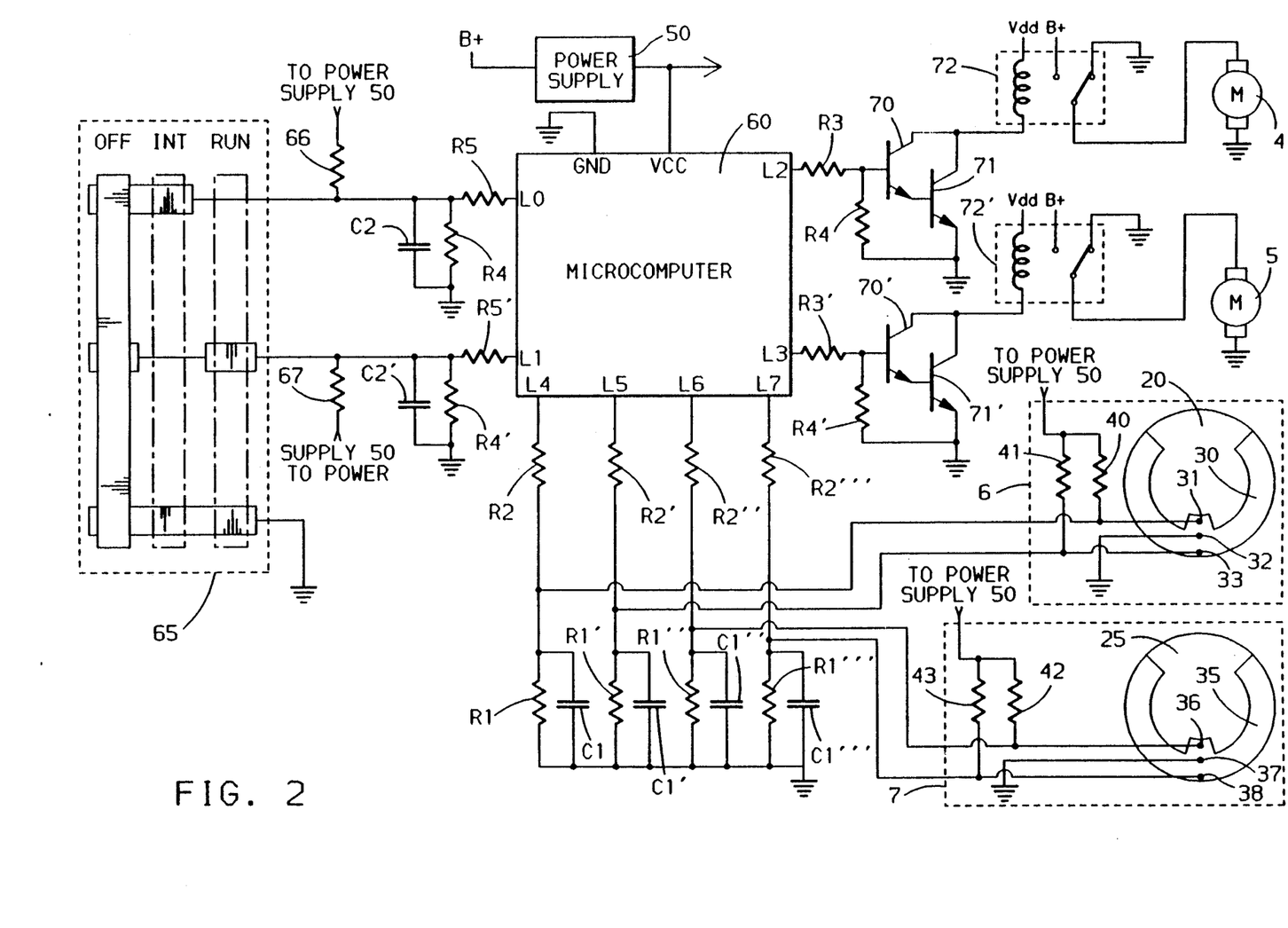
FIG. 2 shows a first embodiment of a wiper system according to the invention.

Referring now to FIG. 2, identical key position sensors 6,7 are illustrated. At least one electrically conductive pattern 30 is fixedly disposed anularly about the perimeter of the electrically insulative substrate of cam plate 20. Contacts 31,32,33 are arranged linearly along a single radius of cam plate 20, each contact being located at a unique distance relative to the others from center of cam plate 20. These contacts are stationary with respect to rotation of cam plate 20 and maintain physical contact with the conductive or insulative material of cam plate 20 immediately below them. Contact 31, closest to center of cam plate 20, is electrically connected to a first terminal of resistor 40. A second terminal of resistor 40 is electrically connected to power supply 50. Contact 33, furthest from center of cam plate 20, is electrically connected to a first terminal of resistor 41. A second terminal of resistor 41 is electrically connected to power supply 50. Contact 32, located between contacts 31 and 33, is electrically connected to ground. If the material simultaneously below both contacts 31 and 32 is a portion of electrically conductive pattern 30, then contact 31 is shorted to contact 32 through the material and is forced to ground, thus establishing a low logic level at the first terminal of resistor 40. However, if the material below either contact 31 or 32 is not a portion of electrically conductive pattern 30, then contact 31 is not shorted to contact 32 and is not forced to ground, rather it is pulled up to power supply 50 voltage through resistor 40, thus establishing a high logic level at the first terminal of resistor 40. The same relationship holds true as between contacts 33 and 32 and the material thereunder. Consequently, the material below contacts 33 and 32 will establish either a high or a low logic level at the first terminal of resistor 41.

Cam plate 20 has a synchronous rotational relationship with a complete cycle of wiper blade 2. A convenient synchronous relationship, and the one preferred, is one where cam plate 20 completes one rotation (360 degrees) for one complete wiper cycle of wiper blade 2 (park to park). Other synchronous relationships may be used provided that the ratio of wiper blade cycles to cam plate rotations is a whole number. FIG. 2 shows electrically conductive pattern 30 for a one wiper blade cycle to one cam plate rotation ratio. Multiple identical electrically conductive patterns would be required for any other ratio.

Cam plate 20 is shown in a rotational position corresponding to wiper blade 2 park position 14 wherein the first terminals of resistors 40,41 are forced to ground via the conductive path from contacts 31 and 33 to contact 32 established through electrically conductive pattern 30. To illustrate how the rotation of cam plate 20 is utilized to indicate key positions in wiper blade 2 travel, electrically conductive pattern 30 is such that slight rotation of cam plate 20 will result in the first terminal of resistor 40 being pulled up to power supply 50 voltage because the portion of electrically conductive pattern 30 now below the contacts does not supply a ground path to contact 31. The first terminal of resistor 40 will be forced to ground after a complete rotation of cam plate 20 when once again electrically conductive pattern 30 supplies a ground path to contact 31. Simply put, the first terminal of resistor 40 is grounded when the rotational position of cam plate 20 corresponds to wiper blade 2 park position 14 and is pulled up to power supply 50 voltage when the rotational position of cam plate 20 corresponds to any other wiper blade 2 position. More importantly for key position sensing, the logic level of the first terminal of resistor 40 changes from low to high when the rotational position of cam plate 20 corresponds to wiper blade 2 exiting park position 14 and changes from high to low when the rotational position of cam plate 20 corresponds to wiper blade 2 entering park position 14. Similarly, electrically conductive pattern 30 is such that the first terminal of resistor 41 is grounded when the rotational position of cam plate 20 corresponds to wiper blade 2 being outside interference zone 16, and is pulled up to power supply 50 voltage when the rotational position of cam plate 20 corresponds to wiper blade 2 being inside interference zone 16. Again, more importantly for key position sensing, the logic level of the first terminal of resistor 41 changes from low to high when the rotational position of cam plate 20 corresponds to wiper blade 2 entering interference zone 16, and changes from high to low when the rotational position of cam plate 20 corresponds to wiper blade 2 exiting interference zone 16. The logic levels of the first terminals of resistors 40,41 respectively comprise park and interference output signals of key position sensor 6 to be utilized as described later in this specification.

Key position sensor 7 is configured identically to key position sensor 6 discussed above. It performs the identical functions in the same manner for wiper blade 3. It comprises cam plate 25, electrically conductive pattern 35, contacts 36,37,38, and resistors 42,43. Contact 36 is closest to center of cam plate 25 and is electrically connected to a first terminal of resistor 42. A second terminal of resistor 42 is electrically connected to power supply 50. Contact 38 is furthest from center of cam plate 25 and is electrically connected to a first terminal of resistor 43. A second terminal of resistor 43 is electrically connected to power supply 50. Contact 37, located between contacts 36 and 38, is electrically connected to ground. In the rotation of cam plate 25, electrically conductive pattern 35 is such that the logic level of the first terminal of resistor 42 changes from low to high when wiper blade 3 leaves park position 12 and changes from high to low when wiper blade 3 returns to park position 12. Similarly, electrically conductive pattern 35 is such that the logic level of the first terminal of resistor 43 changes from low to high when wiper blade 3 enters interference zone 16, and changes from high to low when wiper blade 3 exits interference zone 16. The logic levels of the first terminals of resistors 42,43 respectively comprise park and interference output signals of key position sensor 7 to be utilized as described later in this specification.

FIG. 2 shows an example of control 10 which is based upon microcomputer 60. Microcomputer 60 performs monitoring of key position sensors 6,7 and control of motor assemblies 4,5 according to the flow charts shown in FIGS. 3–4. This embodiment utilizes as a preferred choice, although not the only choice, National Semiconductor COP 822 microcomputer which includes CPU, ROM, RAM, digital I/O ports and internal clock. Microcomputer 60 has a Vcc input connected to power supply 50 and digital input/output ports L0–L7. Input ports L0 and L1 are interfaced to mode switch 65 to establish mode of operation; output ports L2 and L3 are interfaced to switching apparatus for motor assemblies 4,5; and input ports L4–L7 are interfaced to the park and interference outputs of key position sensors 6,7. Other pins of microcomputer 60 are connected in a conventional manner familiar to one designing circuits around the National Semiconductor COP 822 or as taught by the manufacturer's data sheets.

Input ports L0 and L1 each receive either a high logic level signal or a low logic level signal as established by mode switch 65. Mode switch 65 allows for user selection of different operating modes such as off, intermittent run and continuous run as labeled respectively as OFF, INT and RUN on mode switch 65. The mode switch in the OFF position would supply a low logic level to both input ports L0 and L1 via the INT and RUN lines respectively and result in no wiper blade activity. The mode switch in the INT position would supply a high logic level to input port L0 via the INT line and a low logic level to input port L1 via the RUN line and result in a single cycle of both wiper blades followed by a predetermined delay before another cycle begins. The mode switch in the RUN position would supply a low logic level to input port L0 via the INT line and a high logic level to input port L1 via the RUN line and result in continuous interference free cycling of both wiper blades as previously described. Each of the various mode switch positions will either ground the INT and RUN lines to establish the low logic level or pull up the INT and RUN lines to a sufficiently high voltage level to establish the high logic level. Capacitor and resistor pairs $C_2/R_4$, and $C_2'/R_4'$ comprise transient filters to protect input ports L0 and L1 from voltage spikes which may result from normal change in the voltage levels of the monitored INT and RUN lines. Resistors $R_4, R_4'$ and $R_5, R_5'$ are chosen appropriately along with mode switch pull up resistors 66,67 so as to ensure microcomputer 60 recognition of the two distinct logic levels of the INT and RUN lines and to dissipate minimal power.

The park and interference output signals of key position sensors 6,7 are monitored via input ports L4–L7. Capacitor and resistor pairs $C_1/R_1$, $C_1'/R_1'$, $C_1''/R_1''$ and $C_1'''/R_1'''$ comprise transient filters to protect input ports L4–L7 from voltage spikes which may result from normal change in the voltage levels of the monitored key position sensors' park and interference output signals. Resistors $R_1, R_1', R_1'', R_1'''$ and $R_2, R_2', R_2'', R_2'''$ are chosen appropriately along with resistors 40,41,42,43 so as to ensure microcomputer 60 recognition of the two distinct logic levels of the outputs of key position sensors 6,7 and to dissipate minimal power.

Switching apparatus responsive to logic levels at output port L2 effective to turn motor assembly 4 on/off comprises a solid state switch and a conventional single pole/double throw relay. Relay 72 when energized causes the switching of power designated as B+ to motor assembly 4, and when deenergized causes the switching of ground to motor assembly 4 which shunts the motor terminals. Relay 72 has a coil, the first terminal of which is connected to a power supply designated as Vdd and a second terminal of which is connected to a first terminal of the solid state switch. A second terminal of the solid state switch is connected to ground, and a third terminal of the solid state switch interfaces with microcomputer 60 at output port L2. When output port L2 is at a high logic level, the solid state switch is commanded on and causes the energizing of relay 72 which in turn causes motor assembly 4 to run. When output port L2 is at a low logic level, the solid state switch is off and causes the deenergizing of relay 72 which in turn causes motor assembly 4 to stop with minimum overshoot due to the dynamic braking effect of the shunted motor terminals. The switching of motor assembly 4 can also be accomplished by a solid state switch to the exclusion of a relay, however a relay's use is preferred since it provides isolation of the solid state electronics from the high current motor assembly and allows for a commonly employed dynamic braking shunt circuit when the motor is commanded off. The solid state switch between the second terminal of the relay coil and ground in this embodiment takes the form of two NPN transistors 70,71 in a Darlington pair configuration. Resistors R3 and R4 are chosen so as to provide proper interfacing between output port L2 and transistor 70 so that the solid state switch recognizes the logic levels of microcomputer 60 and dissipate minimal power.

Switching apparatus responsive to logic levels at output port L3 effective to turn motor assembly 5 on/off comprises relay 72' and a solid state switch made up of a Darlington pair of NPN transistors 70',71' configured identically to the switching apparatus for motor assembly 4 as described previously in this specification. Resistors R3' and R4' are chosen so as to provide proper interfacing between output port L3 and transistor 70' so that the solid state switch recognizes the logic levels of microcomputer 60 and dissipate minimal power.

Figure 3A:
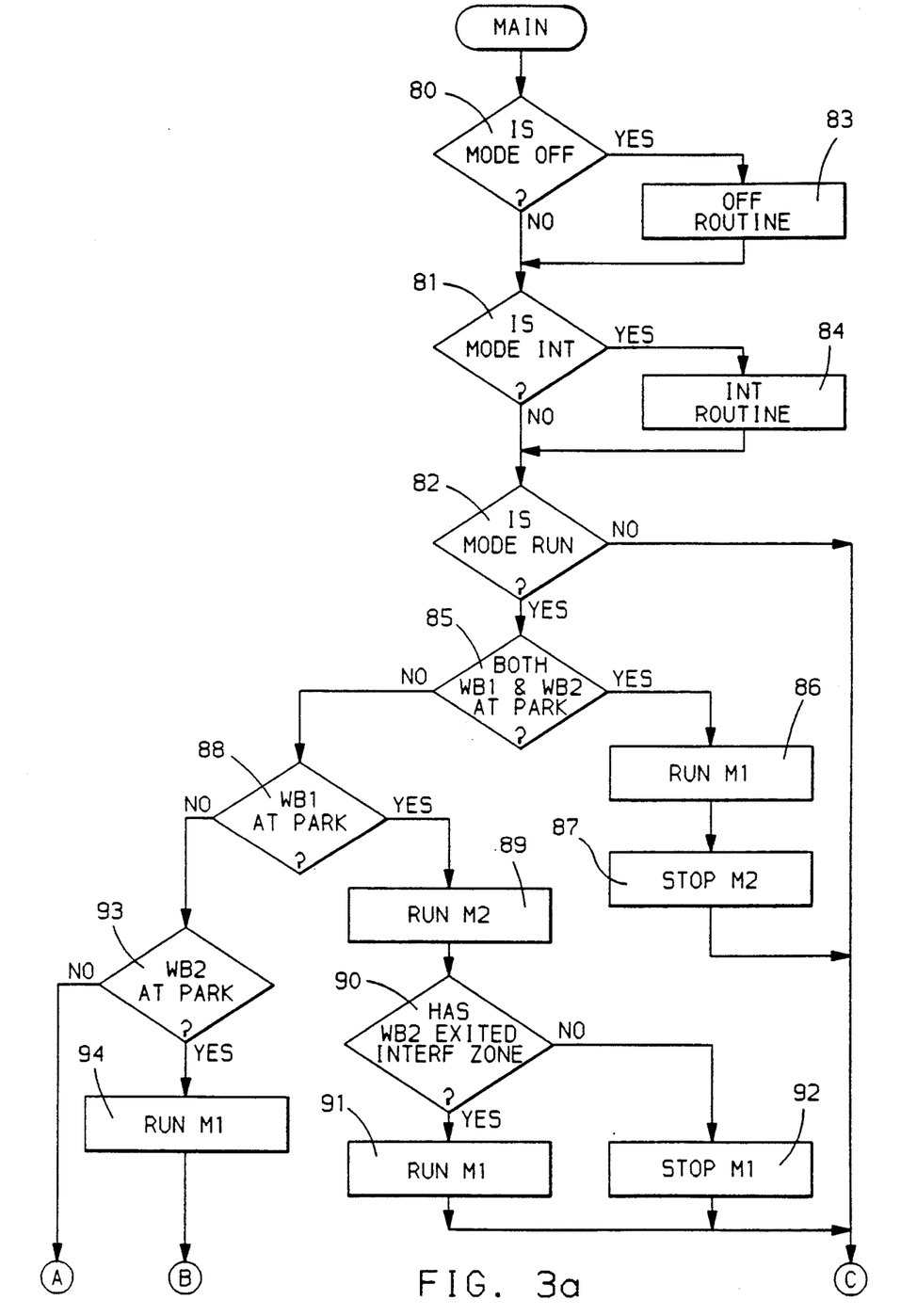
FIGS. 3-4 are flow charts for controlling the embodiment as shown in FIGS. 1-2.
Figure 3B:
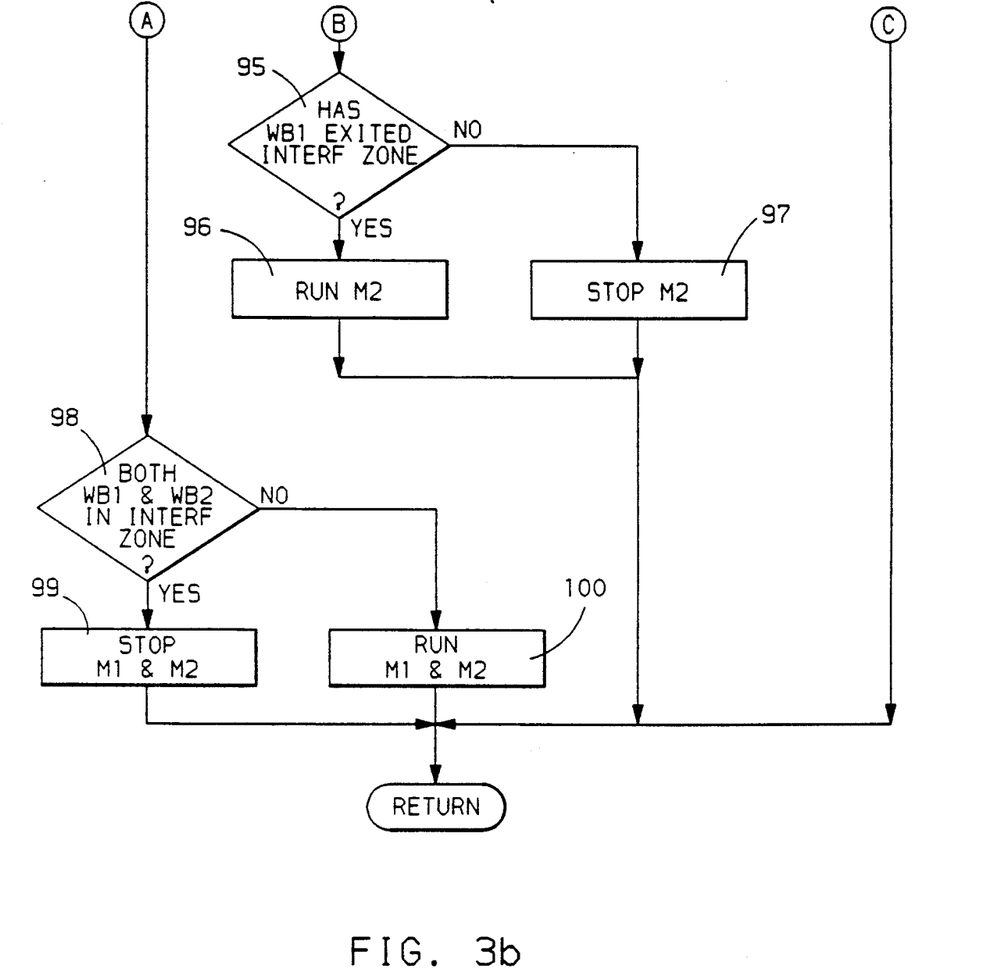
Figure 4:
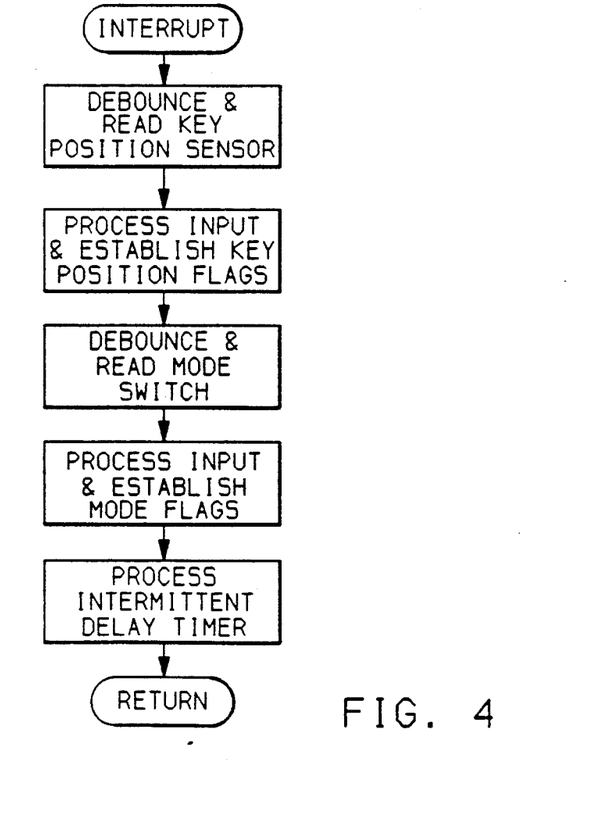

FIG. 3 shows a flow chart of a MAIN routine for controlling the wiper system as described in this embodiment. The MAIN routine runs continually, subject to real time interrupts, when B+ is available. FIG. 4 shows a flow chart of an INTERRUPT routine which runs upon real time interrupts at a predetermined interval of sufficient frequency for adequate resolution commensurate with the cycling speed of the motor assemblies—100 msec in this embodiment—and then returns to the MAIN routine. The INTERRUPT routine debounces, reads and processes the key position sensors' and mode switch's outputs, processes a delay timer to establish and count down a wait period between intermittent mode wiper blade cycles, and establishes the state of system flags therefrom for use in the MAIN routine. Such system flags will indicate current position, zone transitions and mode of operation selected. The MAIN routine controls the cycling of the wiper blades according to the state of these system flags as established by the interrupt processing of the mode switch and key position sensors output signals.

Referring to FIG. 3, the MAIN routine begins a mode check portion at 80 by checking the state of an OFF mode flag which has a first value if the mode switch is in OFF and another value if the mode switch is not in OFF. Assuming the OFF mode flag state indicates that the mode switch is not in OFF, the state of an INT mode flag is checked at 81 which has a first value if the mode switch is in INT and another value if the mode switch is not in INT. Assuming the INT mode flag state indicates that the mode switch is not in INT, the state of a RUN mode flag is checked at 82 which has a first value if the mode switch is in RUN and another value if the mode switch is not in RUN. If the RUN mode flag state indicates that the mode switch is not in RUN, the routine returns to 80 and begins the mode check portion of the MAIN routine again.

Assuming the mode switch is in RUN, and continues to be in RUN until indicated otherwise, and the RUN mode flag state indicates so, the check at 82 allows a run portion of the MAIN routine to begin at 85 by checking the state of a BOTH PARK flag which has a first value if both first and second wiper blades are both at their respective park positions and a second value if either wiper blade is not at its respective park position. If both wiper blades are at their respective park positions, a wipe cycle will be initiated at 86 and 87. At 86, a first motor assembly is commanded on resulting in the first wiper blade beginning movement out of its park position to begin its cycle; at 87, a second motor assembly is commanded off resulting in the second wiper blade remaining at its park position. The routine next returns to 80, begins the mode check portion of the MAIN routine and passes checks at 81 and 82 to arrive again at the run portion of the MAIN routine at 85. The routine will continue to command the first motor assembly on at 86 and the second motor assembly off at 87 until the BOTH PARK flag state is changed during an interrupt processing to indicate that the first wiper blade has moved out of its park position, as will be indicated by a logic level transition of the corresponding key position sensor's park output signal.

Assuming that the first wiper blade has now moved out of its park position and the second wiper blade is still in its park position, the check of the BOTH PARK flag at 85 allows the run portion of the MAIN routine to continue at 88 by checking the state of a WB1 PARK flag which has a first value if the first wiper blade is at its park position and a second value if the first wiper blade is not at its park position. Since the first wiper blade is not at its park position as indicated by the state of the WB1 PARK flag, the routine continues at 93 by checking the state of a WB2 PARK flag which has a first value if the second wiper blade is at its park position and a second value if the second wiper blade is not at its park position. Since the second wiper blade is at its park position as indicated by the state of the WB2 PARK flag, the routine continues at 94 by commanding the first motor assembly on thus continuing the first wiper blade cycle. The routine continues at 95 by checking the state of a WB1 EX flag which has a first value if the first wiper blade has exited an interference zone during its current cycle, and a second value if the first wiper blade has not exited the interference zone during its current cycle. Assuming that the first wiper blade is still early enough in its cycle that it has not yet exited the interference zone, it is premature to allow the second wiper blade to begin its cycle. This is so because the first wiper blade is either (1) moving toward its direction reversing position within or approaching the interference zone, or (2) moving away from its direction reversing position but still within the interference zone; and to allow the second wiper blade to begin its cycle when the first wiper blade is within the interference zone and/or moving toward its direction reversing position would invite a collision of the first and second wiper blades. Therefore, the routine continues at 97 by commanding the second motor assembly off thereby maintaining the second wiper blade in its current park position. The routine returns to 80, begins the mode check portion of the MAIN routine and passes checks at 81 and 82 to arrive again at the run portion of the MAIN routine at 85. Since the first wiper blade is not at its park position and the second wiper blade is at its park position, the routine passes checks at 85, 88 and 93, commands the first motor assembly on at 94, and arrives at 95. The routine will continue to command the second motor assembly off at 97 until the WB1 EX flag state is changed during an interrupt processing to indicate that the first wiper blade has exited the interference zone, as will be indicated by a logic level transition of the corresponding key position sensor's interference output signal.

Assuming that the first wiper blade has now exited the interference zone and is moving toward its park position, and the second wiper blade is still in its park position, the routine passes through 85, 88, 93 and 94 to arrive at 95. Since the first wiper blade has exited the interference zone as indicated by the state of the WB1 EX flag, it is now proper to allow the second wiper blade to begin its cycle. This is so because the first wiper blade is no longer within the interference zone and is moving in the radial direction toward its park position and in the same radial direction as will the second wiper blade as it is immediately commanded on. Therefore, the routine continues at 96 by commanding the second motor assembly on resulting in the second wiper blade beginning movement out of its park position to begin its cycle. The first and second motor assemblies are now simultaneously commanded on and the first and second wiper blades are simultaneously moving in the same radial direction, each free from interference with the other. The routine returns to 80, begins the mode check portion of the MAIN routine and passes checks at 81 and 82 to arrive again at the run portion of the MAIN routine at 85. The routine will continue to pass through 85, 88 and 93, command the first motor assembly on at 94, pass through 95 and command the second motor assembly on at 96 until the WB2 PARK flag state is changed during an interrupt processing to indicate that the second wiper blade has moved out of its park position, as will be indicated by a logic level transition of the corresponding key position sensor's park output signal.

Assuming that the second wiper blade is now out of its park position moving toward its direction reversing position, and the first wiper blade continues moving toward its park position so that both wiper blades are simultaneously moving in the same radial direction, the routine passes through 85 and 88 to arrive at 93. Since the second wiper blade is not at its park position as indicated by the state of the WB2 PARK flag, the routine continues at 98 by checking the state of a BOTH INTF flag which has a first value if both wiper blades are within the interference zone, and a second value if either wiper blade is not within the interference zone. This check at 98 is a failure mode check designed to prevent system damage. If both wiper blades are within the interference zone as indicated by the BOTH INTF flag, both motor assemblies will immediately be commanded off at 99. The routine returns to 80, begins the mode check portion of the MAIN routine and passes checks at 81 and 82 to arrive again at the run portion of the MAIN routine at 85. The routine will continue to pass through 85, 88, 93 and 98, and command both motor assemblies off at 99 so as to prevent potentially damaging contact of the wiper blades until such time as the condition responsible for both wiper blades being in the interference zone is rectified. Assuming that both wiper blades are not simultaneously within the interference zone as indicated by the BOTH INTF flag, both motor assemblies will be commanded on at 100. The routine returns to 80, begins the mode check portion of the MAIN routine and passes checks at 81 and 82 to arrive again at the run portion of the MAIN routine at 85. The routine will continue to pass through 85, 88, 93 and 98, and command both motor assemblies on at 100 until the WB1 PARK flag state is changed during an interrupt processing to indicate that the first wiper blade has reached its park position, as will be indicated by a logic level transition of the corresponding key position sensor's park output signal.

Assuming that the first wiper blade has now reached its park position and the second wiper blade is still moving toward its direction reversing position, the check of the BOTH PARK flag at 85 allows the run portion of the MAIN routine to continue at 88 by checking the state of the WB1 PARK flag. Since the first wiper blade is at its park position as indicated by the state of the WB1 PARK flag, the routine continues at 89 by commanding the second motor assembly on thus continuing the second wiper blade cycle. The routine continues at 90 by checking the state of a WB2 EX flag which has a first value if the second wiper blade has exited the interference zone during its current cycle, and a second value if the second wiper blade has not exited the interference zone during its current cycle. Assuming that the second wiper blade is still early enough in its cycle that it has not yet exited the interference zone, it is premature to allow the first wiper blade to begin another cycle. This is so because the second wiper blade is either (1) moving toward its direction reversing position within or approaching the interference zone, or (2) moving away from its direction reversing position but still within the interference zone; and to allow the first wiper blade to begin its cycle when the second wiper blade is within the interference zone and/or moving toward its direction reversing position would invite a collision of the first and second wiper blades. Therefore, the routine continues at 92 by commanding the first motor assembly off thereby maintaining the first wiper blade in its current park position. The routine returns to 80, begins the mode check portion of the MAIN routine and passes checks at 81 and 82 to arrive again at the run portion of the MAIN routine at 85. Since the second wiper blade is not at its park position and the first wiper blade is at its park position, the routine passes checks at 85 and 88, commands the second motor assembly on at 89, and arrives at 90. The routine will continue to command the first motor assembly off at 92 until the WB2 EX flag state is changed during an interrupt processing to indicate that the second wiper blade has exited the interference zone, as will be indicated by a logic level transition of the corresponding key position sensor's interference output signal.

Assuming that the second wiper blade has now exited the interference zone and is moving toward its park position, and the first wiper blade is still in its park position, the routine passes through 85, 88, and 89 to arrive at 90. Since the second wiper blade has exited the interference zone as indicated by the state of the WB2 EX flag, it is now proper to allow the first wiper blade to begin another cycle. This is so because the second wiper blade is no longer within the interference zone and is moving in the radial direction toward its park position and in the same radial direction as will the first wiper blade as it is immediately commanded on. Therefore, the routine continues at 91 by commanding the first motor assembly on resulting in the first wiper blade beginning movement out of its park position to begin another cycle. The first and second motor assemblies are now simultaneously commanded on and the first and second wiper blades are simultaneously moving in the same radial direction, each free from interference with the other. The routine returns to 80, begins the mode check portion of the MAIN routine and passes checks at 81 and 82 to arrive again at the run portion of the MAIN routine at 85. The routine will continue to pass through 85 and 88, command the second motor assembly on at 89, pass through 90 and command the first motor assembly on at 91 until the WB1 PARK flag state is changed during an interrupt processing to indicate that the first wiper blade has moved out of its park position, as will be indicated by a logic level transition of the corresponding key position sensor's park output signal.

Assuming that the first wiper blade is now out of its park position moving toward its direction reversing position, and the second wiper blade continues moving toward its park position so that both wiper blades are simultaneously moving in the same radial direction, the routine passes through 85 and 88 to arrive at 93. Since the second wiper blade is not at its park position as indicated by the state of the WB2 PARK flag, the routine continues at 98 by checking the state of the BOTH INTF flag and allowing the routine to continue at 99 or 100 as appropriate and as previously described. Assuming that both wiper blades are not simultaneously within the interference zone as indicated by the BOTH INTF flag, both motor assemblies will be commanded on at 100. The routine returns to 80, begins the mode check portion of the MAIN routine and passes checks at 81 and 82 to arrive again at the run portion of the MAIN routine at 85. The routine will continue to pass through 85, 88, 93 and 98, and command both motor assemblies on at 100 until the WB2 PARK flag state is changed during an interrupt processing to indicate that the second wiper blade has reached its park position, as will be indicated by a logic level transition of the corresponding key position sensor's park output signal.

At this point, both wiper blades have completed a cycle and the first wiper blade has started a new cycle. The routine will continue as described and maintain interference free operation of the wiper blades until the mode switch is changed from RUN to INT or OFF, after which the mode check portion of the MAIN routine will proceed to the appropriate intermittent run portion or off portion of the MAIN routine as indicated by the appropriate INT or OFF mode flag state.

If the mode switch is in INT, the intermittent run portion of the MAIN routine, represented as 84, will be executed. The intermittent run portion of the MAIN routine avoids wiper blade interference in the same manner as the run portion of the MAIN routine; that is to say, if a wiper blade currently in its park position is to begin a cycle, it will not do so until a wiper blade currently moving through its cycle has exited the interference zone and is returning to its park position. The intermittent run portion of the MAIN routine differs from the run portion of the MAIN routine in that once the first wiper blade returns to its park position at the end of its cycle, it will not begin another cycle upon the second wiper blade exiting the interference zone. Rather, the second wiper blade returns to its park position and both wiper blades remain at their respective park positions until a predetermined delay expires. After the predetermined delay expires, the first wiper blade begins a single cycle, followed by the second wiper blade beginning a single cycle after the first wiper blade exits the interference zone, with the first wiper blade then returning to its park position at the end of its cycle and remaining there until the second wiper blade returns to its park position at the end of its cycle and the predetermined delay once again times out. The delayed cycling of both wiper blades will continue until the mode switch is changed to OFF or RUN.

If the mode switch is in OFF, the off portion of the MAIN routine, represented as 83, will be executed. The off portion of the MAIN routine avoids wiper blade interference in the same manner as the run portion of the MAIN routine; that is to say, if a wiper blade currently in its park position is to begin a cycle, it will not do so until a wiper blade currently moving through its cycle has exited the interference zone and is returning to its park position. The purpose of the off portion of the MAIN routine is to allow currently cycling wiper blades to finish their respective cycles interference free and to retain both wiper blades in their respective park positions once they complete their cycles. If both wiper blades are at their respective park positions, they will remain there until the mode switch changes to INT or RUN.

The preceding description of a preferred embodiment is offered by way of illustration and example and not by way of limitation or exclusion of other embodiments consistent with the spirit and scope of the invention.

The embodiments of the invention in which an exclusive property or privilege is claimed are defined as follows:

1. A motor vehicle glass wiper system comprising, in combination:
   first and second wiper blade systems, each wiper blade system having a wiper blade and a motor assembly, each wiper blade having a wipe pattern when its respective motor assembly is energized that is bounded by an outboard direction reversing position and an inboard direction reversing position, the wipe patterns of the first and second wiper blades each having a first zone adjacent its inboard direction reversing position and a second zone adjacent its outboard direction reversing position;
   a respective sensing means for each wiper blade for indicating the transition of the wiper blade between the zones of its wipe pattern;
   wiper motor control means for energizing each one of the wiper motors to move its respective wiper blade to the inboard direction reversing position and back to the outboard direction reversing position each time the sensing means of the other one of the wiper blades indicates a transition from the first zone to the second zone of its wipe pattern, whereby each one of the wiper blades is at the outboard direction reversing position of its wipe pattern while the other one of the wiper blades is moving toward or is in the first zone of its wipe pattern so that interference between the wiper blades is inhibited.

2. A motor vehicle glass wiper system comprising, in combination:
   first and second wiper blade systems, each wiper blade system having a wiper blade and a motor assembly, each wiper blade having a wipe pattern when its respective motor assembly is energized that is bounded by an outboard direction reversing position and an inboard direction reversing position, the wipe patterns of the first and second wiper blades each intersecting the other to establish an interference zone of potential wiper blade contact adjacent both inboard direction reversing positions and bounded thereby;
   a respective sensing means for each wiper blade for indicating the transitions of the wiper blade into and out of the interference zone;
   wiper motor control means for energizing each one of the wiper motors to move its respective wiper blade to the inboard direction reversing position and back to the outboard direction reversing position each time the sensing means of the other one of the wiper blades indicates a transition out of the interference zone, whereby each one of the wiper blades is at the outboard direction reversing position of its wipe pattern while the other one of the wiper blades is moving toward or is in the interference zone so that interference between the wiper blades is inhibited.

3. A motor vehicle glass wiper system as defined in claim 2 wherein each outboard direction reversing position comprises a wiper blade park position for its respective wiper blade.

4. A motor vehicle glass wiper system as defined in claim 3 further including means for initiating wiper operation by energizing a selected one of the motors to move its respective wiper blade to the inboard direction reversing position and back to the park position.

5. A motor vehicle glass wiper system as defined in claim 2 further including means for terminating wiper operation by deenergizing both of the wiper motors to stop both wiper blades each time the sensing means indicate both wiper blades are simultaneously within the interference zone.

6. A method for inhibiting wiper blade interference for a motor vehicle glass dual wiper blade system having two motor assemblies with corresponding first and second wiper blades, inboard and outboard direction reversing positions for each wiper blade, and overlapping individual wipe patterns which comprises:
   establishing for each wiper blade a first zone adjacent its inboard direction reversing position and a second zone adjacent its outboard direction reversing position;

sensing a transition of each wiper blade into and out of the zones;

energizing each one of the wiper motors to move its respective wiper blade to the inboard direction reversing position and back to the outboard direction reversing position each time the other one of the wiper blades moves out of the first zone, whereby each one of the wiper blades is at the outboard direction reversing position of its wipe pattern while the other one of the wiper blades is moving toward or is in the first zone so that interference between the wiper blades is inhibited.

7. A method for inhibiting wiper blade interference for a motor vehicle glass dual wiper blade system having two motor assemblies with corresponding first and second wiper blades, inboard and outboard direction reversing positions for each wiper blade, and overlapping individual wipe patterns which comprises:

establishing an interference zone of potential wiper blade contact as the area adjacent both inboard direction reversing positions and bounded thereby;

sensing a transition of each wiper blade into and out of the interference zone;

energizing each one of the wiper motors to move its respective wiper blade to the inboard direction reversing position and back to the outboard direction reversing position each time the other one of the wiper blades moves out of the interference zone, whereby each one of the wiper blades is at the outboard direction reversing position of its wipe pattern while the other one of the wiper blades is moving toward or is in the interference zone so that interference between the wiper blades is inhibited.

* * * * *